M. H. JOHNSON.
COASTER BRAKE.
APPLICATION FILED MAR. 3, 1914.
1,138,956.
Patented May 11, 1915.
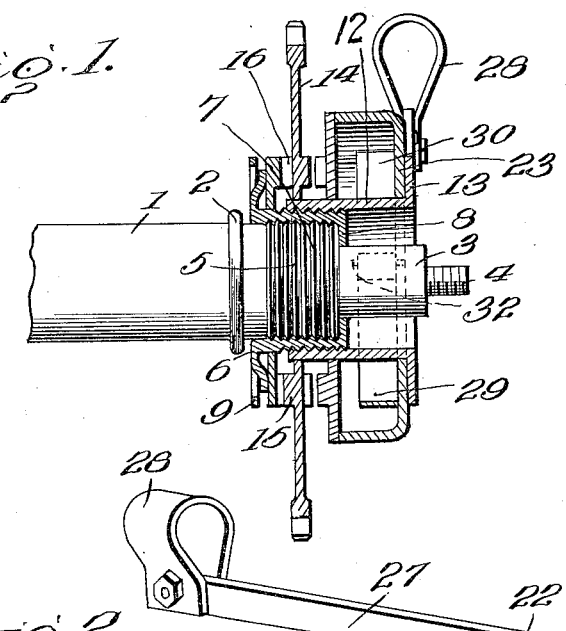
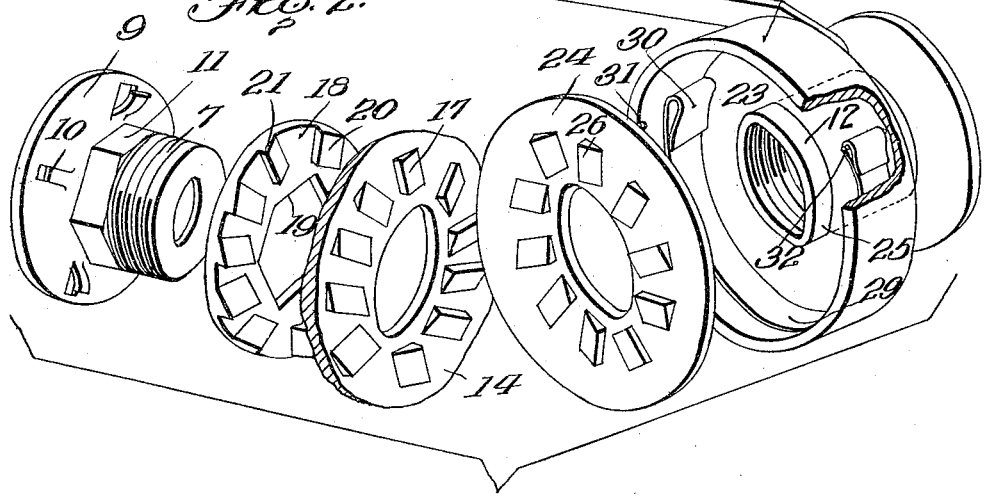
Inventor
Martin H. Johnson.
Witnesses
By
Attorneys.

UNITED STATES PATENT OFFICE.

MARTIN H. JOHNSON, OF LITTLE FALLS, MINNESOTA.

COASTER-BRAKE.

1,138,956.     Specification of Letters Patent.     Patented May 11, 1915.

Application filed March 3, 1914. Serial No. 822,230.

*To all whom it may concern:*

Be it known that I, MARTIN H. JOHNSON, citizen of the United States, residing at Little Falls, in the county of Morrison and State of Minnesota, have invented certain new and useful Improvements in Coaster-Brakes, of which the following is a specification.

This invention relates to coaster brakes for bicycles and similar vehicles, and has as its object to provide a coaster brake which will be simple in construction and devoid of complicated parts, and one which will not be liable to become disarranged or fail to operate as required.

It is one aim of the invention to provide a coaster brake in which all of the parts will be located exteriorly of the hub to which the brake is applied, so that the hub may remain of the ordinary size, and, furthermore, will not be subjected to any unusual strain or wear.

Another aim of the invention is to provide a coaster brake so constructed that when the brake is applied the parts will not be locked, as is the case in many devices of this class, but which, on the other hand, may be readily applied and readily and quickly released.

In the accompanying drawings: Figure 1 is a vertical longitudinal sectional view through the coaster brake embodying the present invention. Fig. 2 is a group perspective view illustrating the parts of the brake disassembled.

In the drawings, the numeral 1 includes the hub upon which the brake mechanism is mounted, and the said hub is provided with the usual spoke flange 2 and is rotatably mounted upon a spindle, indicated at 3, and having the usual reduced threaded end 4 to which is to be secured the rear fork of the bicycle or the like. The hub 1 has its end portion exteriorly threaded, as indicated at 5, and fitted upon the said end of the hub is a thimble 6 which, in addition to being interiorly threaded for connection with the hub, is, for a purpose to be presently explained, exteriorly threaded as at 7. The outer end of the thimble 5 is provided with an inwardly projecting flange 8 which bears against the end of the hub when the thimble is threaded thereon, it being understood that due to the provision of this flange, the threads of the hub and thimble are relieved of strain when force is exerted tending to further thread the thimble upon the hub.

The thimble 6 is provided at its inner end with an outstanding annular flange 9, and this flange is provided with a number of resilient fingers 10 stamped out therefrom and projecting toward the outer end of the thimble. Immediately adjacent the flange 9 the thimble is exteriorly of polygonal form, as indicated at 11, and the purpose of so constructing the same will be presently pointed out.

A brake hub, indicated by the numeral 12 is interiorly threaded and fitted upon the threaded portion 7 of the thimble 6 and this hub is exteriorly smooth and cylindrical. For a purpose to be presently explained, the brake hub 12 is provided at its outer end with an outstanding annular flange 13. The sprocket gear for transmitting motion to the hub 1 is indicated by the numeral 14, and is rotatably mounted upon the brake hub 12 at the inner end thereof, this gear being provided upon one side with beveled clutch teeth 15 arranged in an annular series and having abrupt faces 16, a similar series of teeth 17 being formed upon the other face of the said gear. A clutch disk 18 is provided with an axially located opening 19, the wall of which is polygonal to fit the portion 11 of the thimble 6, whereby the said disk is connected for rotation with the said thimble and the hub upon which the thimble is mounted. The clutch disk 18 is provided with an annular series of clutch teeth 20 which are beveled and which have abrupt faces 21 presented in a direction the opposite to the direction of rotation of the said thimble and hub. That face of the disk 18 other than the one which is provided with the teeth 20, is plane, and by reference to Fig. 1 of the drawings, it will be observed that the spring fingers 10 bear against the said face of the clutch disk and normally hold the same shifted toward the sprocket gear 14 so that the clutch teeth 20 will normally engage with the clutch teeth 15 upon the said gear, whereby when the gear is rotated forwardly, in the act of pedaling, corresponding rotary motion will be imparted to the hub 1 through the clutch disk 18 and the thimble 6 upon which it is mounted. It will be apparent, however, that due to the fact that the clutch teeth are beveled, the gear 14 may be rotated rearwardly with respect to the clutch disk 18 or may be held stationary while the said disk is rotating forwardly.

The brake mechanism includes a cylindrical casing which is relatively short and which is indicated in general by the numeral 22, and this casing is provided with a fixed head 23 and a rotatable head, in the nature of a disk, 24, rotatably mounted upon the brake hub 12. The fixed head 23 of the casing is formed with an opening 25 rotatably receiving the brake hub 12, and by reference to Fig. 1, it will be observed that the casing is so disposed upon the hub 12 that the said fixed head will rest against the flange 13, the rotatable head of the casing being disposed against the open side of the body of the casing. The said head 24 is provided upon its face which is presented toward the sprocket gear 14, with a series of clutch teeth 26 which are designed to coöperate with the teeth 17 of the sprocket gear for a purpose to be presently pointed out. As a means for holding the casing 22 against rotation upon the brake hub 12, an arm 27 is secured at one end to the fixed head 23 of the said casing and extends forwardly and is provided at its forward end with a clip 28 designed to be secured about one member of the rear forks of the bicycle.

The brake band of the brake mechanism is indicated by the numeral 29 and is provided at its ends with loops or eyes 30, the loop or eye at one end of the band receiving a pin 31 which projects from the face of the disk 24 and the eye at the other end of the band receiving a pin 32 which projects from the inner side of the fixed head of the casing. The pin 31 is located nearer the axis of the disk 24 than is the pin 32 with relation to the axis of the casing 22, and the brake band is arranged within the casing so as to surround the brake hub 12, it being understood that when the disk 24 is rotated backwardly, the pin 31 will carry the associated end of the brake band in a corresponding direction, thereby tightening the band about the brake hub. Due to the relative location of the pins 31 and 32 with respect to the axes of the disk 24 and the casing 22 respectively, the first mentioned pin and the corresponding end of the brake band may, in the backward rotation of the disk 24, pass the pin 32 without interfering therewith.

From the foregoing description of the invention, it will be apparent that as the sprocket gear 14 is rotated forwardly, the teeth 15 will be in clutch with the teeth 20 and forward rotative movement will be imparted to the hub 1 through the thimble 6. Should it be desired to coast, the rider of the bicycle has merely to cease pedaling, whereupon the sprocket gear 14 will be held stationary, and, due to the bevel of the clutch teeth 10 and 20, will be shifted to the right in Fig. 1 of the drawings and to position with its teeth 17 in clutch with the teeth 26. Should it be desired to apply the brake, the rider has only to back pedal, thereby rotating the sprocket gear 14 rearwardly as also the disk 24, upon which movement of the disk, the brake band 29 will be tightened about the brake hub 12.

Having thus described the invention, what is claimed as new is:

1. In a coaster brake, a thimble to be fitted to a wheel hub, a clutch member carried by the thimble for rotation therewith, a gear mounted for rotation and having a clutch element for coöperation with the said clutch member, means for automatically shifting the gear, a brake hub connected for rotation with the said thimble, a stationary member, a member mounted for rotation, means for rotating the member and a brake band connected at its ends to the stationary and rotatable members and surrounding the hub.

2. In a coaster brake, a thimble to be fitted to a wheel hub and carrying a clutch member, a brake hub connected to the thimble for rotation therewith, a stationary member upon the said brake hub, a member mounted upon the brake hub for turning movement and having a clutch member, a gear mounted for rotation between the clutch member of the thimble and the last-mentioned clutch member and shiftable to coöperate with either of the said members, and means for automatically shifting the gear, a brake band surrounding the brake hub and connected to the stationary and rotatable members upon the said brake hub.

3. In a coaster brake, a thimble to be fitted to a wheel hub and carrying a clutch member, a brake hub connected for rotation with the thimble, a gear mounted for rotation upon the said brake hub and having a clutch face opposing the clutch of the thimble, a member mounted for rotation upon the said brake hub, the said member and the said gear having clutch faces arranged to coact when the gear is shifted, means for automatically shifting the gear, a stationary member, and a brake band surrounding the said brake hub and connected to the rotatable member and the stationary member.

4. In a coaster brake, a thimble to be fitted to a wheel hub, a clutch member mounted upon the thimble for rotation therewith and shiftable thereon, resilient means upon the thimble coöperating with the said clutch member to hold the said member yieldably in one direction, a sprocket gear mounted for rotation in juxtaposition to the clutch member and having a clutch face arranged to coact with the said member, the said gear being shiftable and being provided with a second clutch face, means for automatically shifting the gear, a brake hub connected for rotation with the thimble, a member mounted for movement upon the brake hub and having a clutch face opposing the last mentioned clutch face of the said gear, a fixed member, and a brake band surrounding the brake hub and connected at one end to the member which is mounted for turning movement upon the hub and at its other end to the said stationary member.

5. In a coaster brake, a thimble to be fitted to a wheel hub, a clutch member mounted for rotation with the thimble and slidable thereon, resilient fingers upon the thimble bearing against the said clutch member, whereby to yieldably hold the same in one direction, a gear mounted for rotation upon the brake hub and having a clutch face opposing the said clutch member and provided with a second clutch face, means for automatically shifting the gear, a member mounted for rotation upon the said brake hub and having a clutch face arranged to coöperate with the last mentioned clutch face of the gear, a member mounted upon the said brake hub and held stationary, and a brake band connected at its ends to the two last mentioned members and surrounding the said brake hub.

6. In a coaster brake, a hub member, a clutch member rotatable therewith, a gear having a clutch portion to coöperate with the said clutch member, means for automatically moving the gear to position for such coöperation, a brake element rotatable with the clutch member, a stationary and a rotatable member, and a brake band connected at its ends to the stationary and rotatable members and arranged for coöperation with the brake element.

In testimony whereof I affix my signature in presence of two witnesses.

MARTIN H. JOHNSON. [L. S.]

Witnesses:
ARTHUR JOHNSON,
CARL L. ERICKSON.

Copies of this patent may be obtained for five cents each, by addressing the "Commissioner of Patents, Washington, D. C."